(12) United States Patent
Onuki (10) Patent No.: US 7,883,224 B2
(45) Date of Patent: Feb. 8, 2011

(54) VEHICLE OUTSIDE MIRROR DEVICE

(75) Inventor: Hiroyasu Onuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 27 days.

(21) Appl. No.: 11/905,702

(22) Filed: Oct. 3, 2007

(65) Prior Publication Data
US 2008/0259474 A1 Oct. 23, 2008

(30) Foreign Application Priority Data
Oct. 4, 2006 (JP) ............... 2006-273093

(51) Int. Cl.
*G02B 7/182* (2006.01)
*B60R 1/06* (2006.01)

(52) U.S. Cl. ........................ 359/841; 359/877

(58) Field of Classification Search .......... 359/841, 359/872, 873, 877
See application file for complete search history.

(56) References Cited

U.S. PATENT DOCUMENTS

| 4,681,409 A | 7/1987 | Enomoto |
| 4,786,156 A | 11/1988 | Kotani et al. |
| 4,919,526 A | 4/1990 | Umekawa et al. |
| 4,981,349 A | 1/1991 | Tamiya et al. |
| 4,982,926 A * | 1/1991 | Mori et al. .............. 248/479 |
| 5,172,884 A | 12/1992 | Ishiyama |
| 5,369,530 A | 11/1994 | Yamauchi et al. |
| 5,432,641 A * | 7/1995 | Mochizuki .............. 359/841 |
| 5,594,590 A | 1/1997 | Ishiyama |
| 5,636,071 A | 6/1997 | Mochizuki et al. |
| 5,734,517 A * | 3/1998 | Kang .............. 359/877 |
| 5,781,354 A | 7/1998 | Sakata |
| 6,022,113 A | 2/2000 | Stolpe et al. |
| 6,130,514 A * | 10/2000 | Oesterholt et al. .............. 318/438 |
| 6,322,221 B1 * | 11/2001 | van de Loo .............. 359/841 |
| 6,390,630 B1 * | 5/2002 | Ochs .............. 359/841 |
| 6,427,142 B1 * | 7/2002 | Zachary et al. .............. 706/49 |
| 6,679,610 B2 | 1/2004 | Yamauchi |
| 6,793,358 B2 | 9/2004 | Sakata |
| 6,811,270 B2 | 11/2004 | Yoshida |
| 6,866,392 B2 | 3/2005 | Hayashi |
| 6,871,969 B2 | 3/2005 | Yamauchi et al. |
| 6,874,896 B2 | 4/2005 | Yoshida |
| 7,104,660 B2 | 9/2006 | Sakata et al. |
| 7,290,890 B2 | 11/2007 | Yoshida et al. |
| 7,441,912 B2 * | 10/2008 | Onuki .............. 359/841 |
| 2006/0023326 A1 | 2/2006 | Onuki |
| 2006/0238907 A1 | 10/2006 | Onuki et al. |

FOREIGN PATENT DOCUMENTS

| JP | 6-027335 U | 4/1994 |
| JP | 3022165 B2 | 1/2000 |
| JP | 2004-082953 A | 3/2004 |

OTHER PUBLICATIONS

U.S. Appl. No. 11/905,704, filed Oct. 3, 2007, Onuki.
U.S. Appl. No. 11/905,705, filed Oct. 3, 2007, Onuki.
H. Onuki, U.S. PTO Notice of Allowance and Fees Due, U.S. Appl. No. 11/905,704, Jul. 7, 2008, 8 pgs.

(Continued)

*Primary Examiner*—Ricky D Shafer
(74) *Attorney, Agent, or Firm*—Foley & Lardner LLP (57) ABSTRACT

A rotation range control mechanism includes a clutch holder provided around a shaft, a washer fixed to a casing, a control convex portion arranged on the clutch holder, and contact portions arranged on the washer.

10 Claims, 9 Drawing Sheets

OTHER PUBLICATIONS

H. Onuki, U.S. PTO Office Action, U.S. Appl. No. 11/905,705, Jun. 25, 2008, 8 pgs.

H. Onuki, U.S. PTO Notice of Allowance and Fees Due, U.S. Appl. No. 11/905,705, Dec. 30, 2008, 6 pgs.

* cited by examiner

VEHICLE OUTSIDE MIRROR DEVICE

This application claims priority from Japanese Patent Application 2006-273093, filed Oct. 4, 2006 which is incorporated herein by reference in its entirety.

BACKGROUND OF THE INVENTION

1. Field of the Invention

The present invention relates to a vehicle outside mirror device.

2. Description of the Related Art

A conventional vehicle outside mirror device, such as the one disclosed in Japanese Patent Application Laid-open No. 2004-82953, includes a mirror assembly, an electric retracting unit, and a base. The electric retracting unit includes a casing, a motor, a rotational force transmission mechanism, and an electric rotation range control mechanism. The motor, the transmission mechanism, and the electric rotation range control mechanism are housed in the casing. The mirror assembly is electrically rotated via the rotational force transmission mechanism by driving the motor. Furthermore, the mirror assembly is stopped at a position for use or at a mirror-retracted position by the electric rotation range control mechanism.

In the conventional vehicle outside mirror device, because the electric rotation range control mechanism is provided between the casing and the rotational force transmission mechanism, the casing, which is relatively large, needs to be replaced for changing the rotation range of the mirror assembly.

SUMMARY OF THE INVENTION

It is an object of the present invention to at least partially solve the problems in the conventional technology.

An outside mirror device for a vehicle, according to one aspect of the present invention, includes a mirror assembly that is rotatably attached to a body of the vehicle through an electric retracting unit and a base. The electric retracting unit includes a shaft holder that is fixed to the base, a shaft that is provided on the shaft holder, a casing to which the mirror assembly is attached, the casing rotatably mounted around the shaft, a motor that outputs a rotational force, a transmission mechanism that transmits the rotational force to the mirror assembly, and a rotation range control mechanism that is arranged in the casing and that controls a rotation range of the mirror assembly. The rotation range control mechanism includes a clutch member of the transmission mechanism that is provided around the shaft to be axially movable, a washer fixed to the casing, a control convex portion arranged on at least one of the clutch member and the washer, and a contact portion that is arranged on at least other one of the clutch member and the washer and with which the control convex portion comes into close contact to control the rotation range of the mirror assembly.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
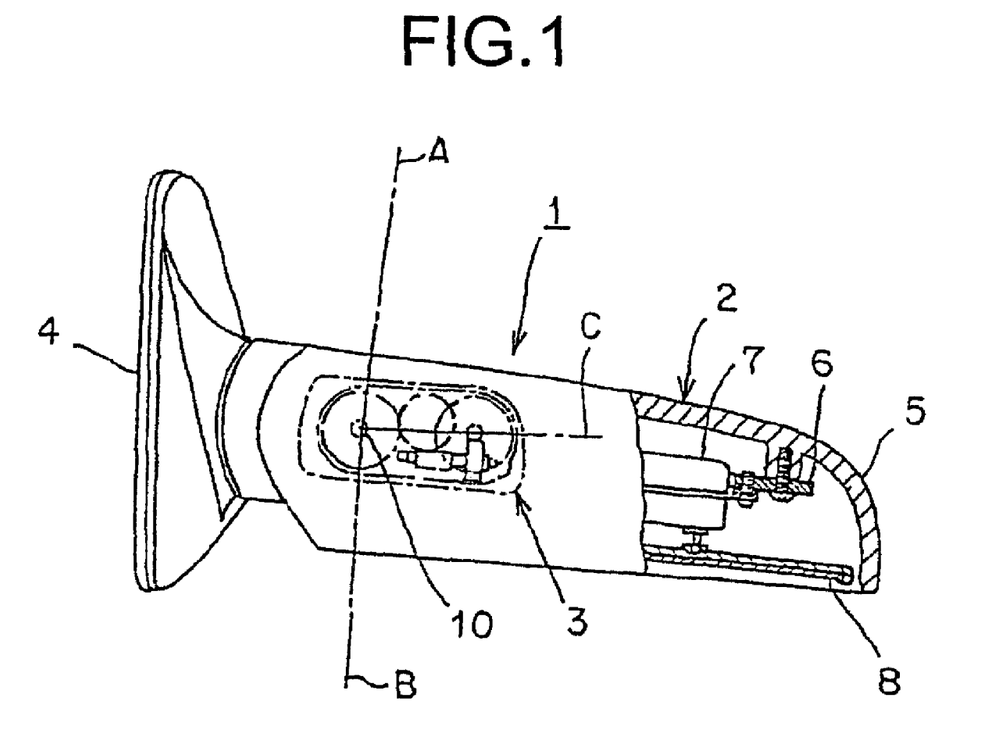
FIG. 1 is a schematic diagram of a vehicle outside mirror device according to a first embodiment of the present invention.

An electric retractable door mirror device (hereinafter, "a door mirror device") 1 that is a vehicle outside mirror device according to a first embodiment of the present invention is shown in FIGS. 1 to 12. The door mirror device 1 is mounted on each of a driver side (right side) door (not shown) and a passenger side (left side) door (not shown) of a vehicle. The door mirror device 1 shown in FIG. 1 is mounted on the right door. A door mirror device mounted on the left side door has a configuration substantially symmetric to the door mirror device 1.

As shown in FIG. 1, the door mirror device 1 including a mirror assembly 2 is rotatably attached to a vehicle body (e.g., a door) (not shown) via an electric retracting unit 3 and a base 4 that is fixed to the door.

The mirror assembly 2 includes a mirror housing 5, an attachment bracket 6, a driving unit 7, and a mirror unit 8. The attachment bracket 6 is attached to the inside of the mirror housing 5, and the driving unit 7 is attached to the attachment bracket 6. The mirror unit 8 is attached to the driving unit 7 so that the mirror unit 8 inclined in the vertical and horizontal directions.

Figure 2:
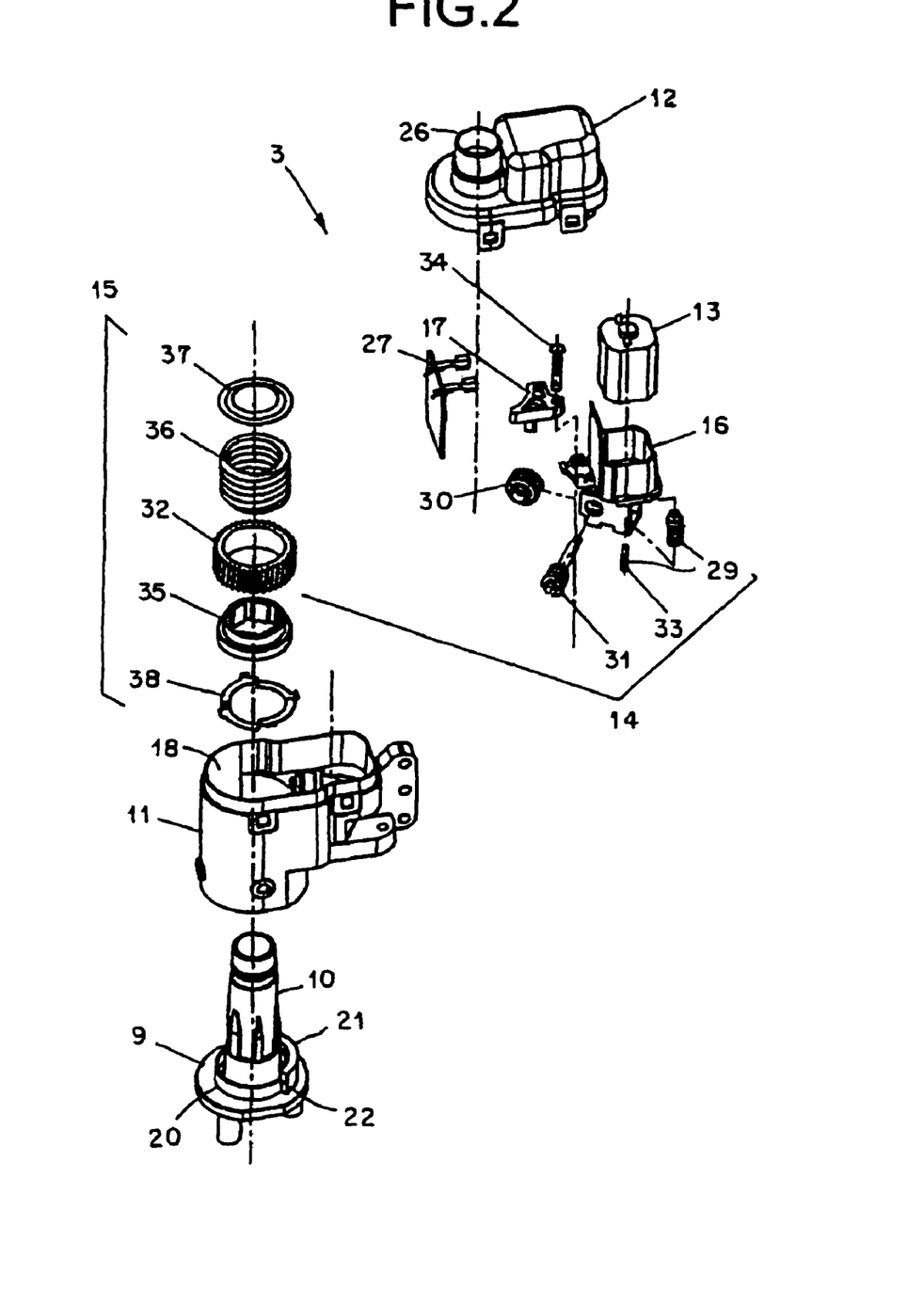
FIG. 2 is an exploded perspective view of an electric retracting unit shown in FIG. 1.

As shown in FIGS. 1 and 2, the electric retracting unit 3 includes a shaft holder 9, a shaft 10, a resin-made gear case 11, a resin-made cover 12, a motor 13, a deceleration mechanism 14, a clutch mechanism 15, a plate 16, and a fixing plate 17.

The gear case 11 and the cover 12 serve as a casing, and the deceleration mechanism 14 and the clutch mechanism 15 serve as a rotational force transmission mechanism.

The shaft holder 9 is fixed to the base 4, and the shaft 10 is integrally provided to the shaft holder 9. The shaft 10 is formed in a hollow, and a harness (not shown) is inserted through the hollow. The gear case 11 and the cover 12 are rotatably attached to the shaft 10. The attachment bracket 6 is attached to the gear case 11. The motor 13, the deceleration mechanism 14, the clutch mechanism 15, the plate 16, and the fixing plate 17 are housed in a housing 18 formed by the gear case 11 and the cover 12.

As shown in FIGS. 2 to 5, 11, and 12, the gear case 11 is closed on the lower side (the side of the shaft holder 9) and is open on the upper side (the side of the cover 12) to form a concave shape in section. An insertion hole 19 is formed in the closed portion of the gear case 11, into which the shaft 10 is inserted. With this configuration, the gear case 11 is rotatably attached to the shaft 10.

Figure 3:
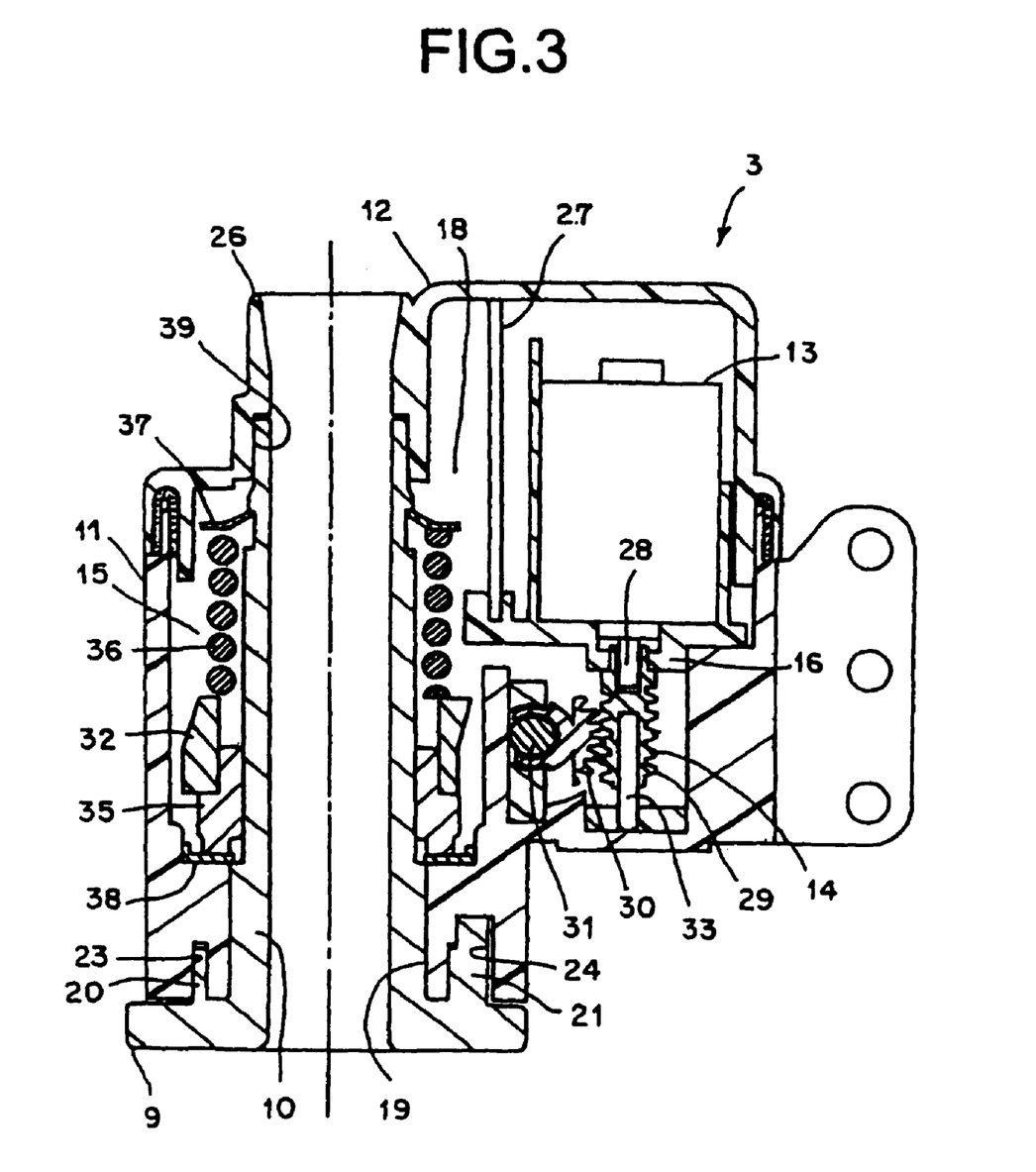
FIG. 3 is a vertical cross section of the electric retracting unit.
Figure 5:
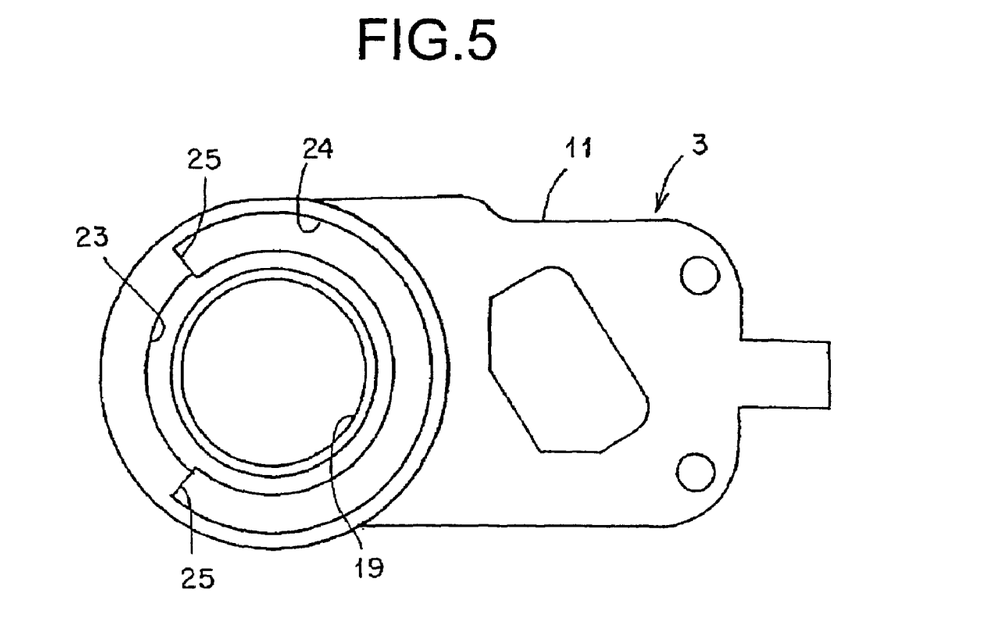
FIG. 5 is a bottom view of a gear case of the electric retracting unit.

As shown in FIGS. 2 and 3, a circular guide projection 20 and an arc-shaped stopper projection 21 are integrally provided on the upper surface of the shaft holder 9. The stopper projection 21 is positioned outside the guide projection 20. The stopper projection 21 has stopper surfaces 22 on both ends. In FIG. 2, only one stopper surface 22 is shown. As shown in FIGS. 3 and 5, a circular guide groove 23 and an arc-shaped guide groove 24 are provided on the lower surface of the gear case 11. The guide groove 24 is positioned outside the guide groove 23 and has a width wider than that of the guide groove 23. Stopper surfaces 25 are provided at step portions formed between the guide grooves 23 and 24. The guide projection 20, the stopper projection 21, the guide groove 23, and the guide groove 24 are arranged around the shaft 10 in a concentric pattern.

The guide projection 20 and the stopper projection 21 on the shaft holder 9 are engaged with the guide groove 23 and the guide groove 24 of the gear case 11, respectively. When the mirror assembly 2 rotates with respect to the base 4, i.e., when the gear case 11 rotates with respect to the shaft holder 9, the guide grooves 23 and 24, the guide projection 20, and the stopper projection 21 function as a guide member for guiding the rotation of the gear case 11.

As shown in FIG. 1, when the mirror assembly 2 rotates forward (counterclockwise) or backward (clockwise) from a normal position C for use in driving a vehicle to get to a mirror position A in which the mirror assembly 2 is inclined forward or a mirror position B in which the mirror assembly 2 is retracted, the stopper surface 25 comes into contact with the stopper surface 22 of the stopper projection 21. Thus, the rotation of the mirror assembly 2 is restricted, so that the mirror assembly 2 does not hit the vehicle body. The stopper surfaces 22 and the stopper surfaces 25 function as a stopper member that prevents the mirror assembly 2 from hitting the vehicle body.

As shown in FIGS. 2 and 3, the cover 12 is closed on the upper side and is open on the lower side (the side of the gear case 11) to form an inverted concave shape in section. A harness-through cylindrical portion 26 that communicates with the shaft 10 is integrally provided to the cover 12. The cover 12 is fitted and fixed to the outside edge of the opening of the gear case 11.

The motor 13, the deceleration mechanism 14, the clutch mechanism 15, the plate 16, the fixing plate 17, and a substrate 27 are housed in the housing 18. The substrate 27 is attached to the plate 16, and a switch circuit (not shown), which controls the motor 13, is mounted on the substrate.

An insertion hole 39 is formed in the cover 12 so that the shaft 10 is inserted through the insertion hole 39 to reach the harness-through cylindrical portion 26. With this configuration, the cover 12 is rotatably attached to the shaft 10 together with the gear case 11.

Figure 4:
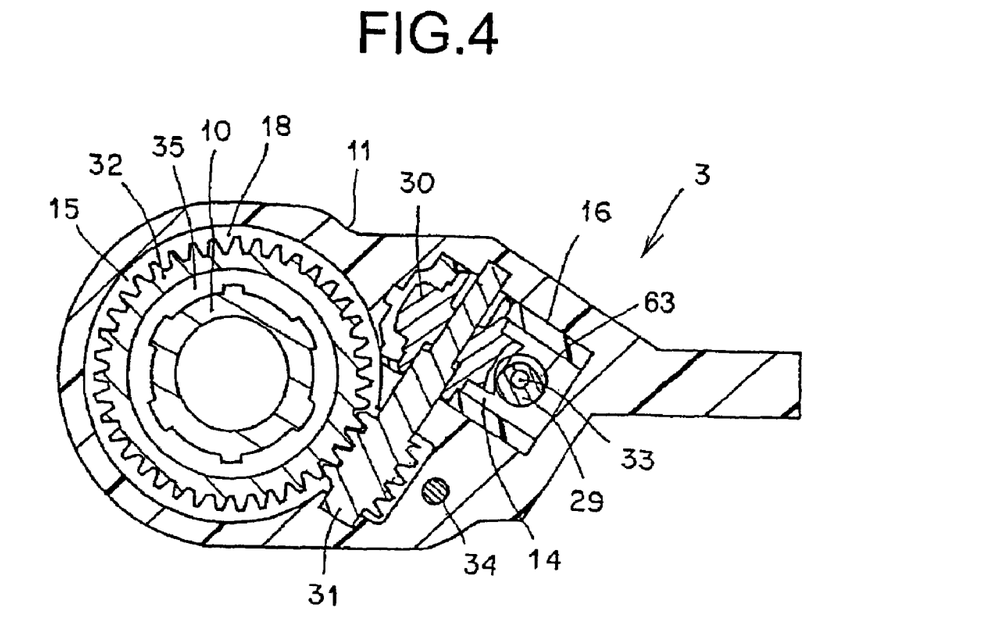
FIG. 4 is a horizontal cross section of the electric retracting unit.

As shown in FIGS. 2 to 4, the deceleration mechanism 14 and the clutch mechanism 15 that function as the rotational force transmission mechanism are housed in the housing 18 so that they are arranged between a gear shaft 28 of the motor 13 and the shaft 10. The deceleration mechanism 14 and the clutch mechanism 15 transmit a rotation force of the motor 13 to the shaft 10. In other words, the motor 13, the deceleration mechanism 14, and the clutch mechanism 15 rotate the mirror assembly 2 with respect to the shaft 10.

The deceleration mechanism 14 includes a first worm gear 29 as a first stage gear, a helical gear 30 as a second stage gear meshing with the first worm gear 29, a second worm gear 31 as a third stage gear, and a clutch gear 32 as a final stage gear meshing with the second worm gear 31.

The first worm gear 29 is rotatably supported by the plate 16 through a pin 33. The first worm gear 29 is coupled to the gear shaft 28. The helical gear 30 is rotatably supported by the plate 16. The second worm gear 31 is rotatably supported by the gear case 11 and the fixing plate 17. The fixing plate 17 is fixed to the gear case 11 with a screw 34. The helical gear 30 and the second worm gear 31 are coupled to be integrally rotatable.

The clutch mechanism 15 includes the clutch gear 32, a clutch holder 35, a spring 36, a push nut 37, and a washer 38. The clutch mechanism 15 is formed by sequentially fitting the washer 38, the clutch holder 35, the clutch gear 32, and the spring 36 over the shaft 10, and fixing the push nut 37 to the shaft 10. The spring 36 is in a compressed state. The clutch gear 32 and the clutch holder 35 are intermittently coupled to each other. The second worm gear 31 meshes with the clutch gear 32, so that a rotational force of the motor 13 is transmitted to the shaft 10.

Figure 6:
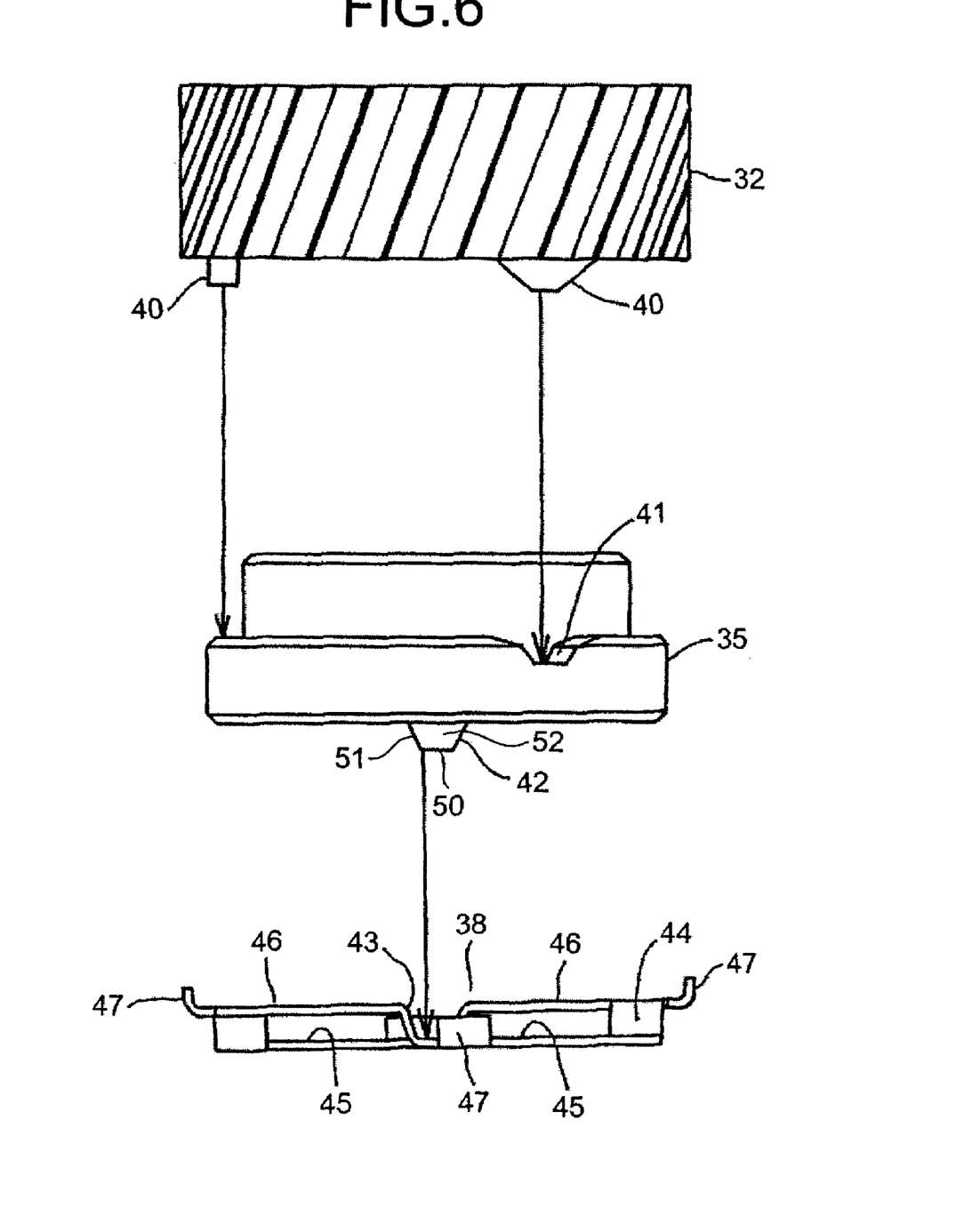
FIG. 6 is an exploded front view of a clutch gear, a clutch holder, and a washer shown in FIG. 2.

A clutch member includes the clutch gear 32 and the clutch holder 35. The clutch gear 32 is arranged on the shaft 10 to be rotatable about the shaft 10 and movable in an axial direction of the shaft 10. The clutch holder 35 is arranged on the shaft 10 to be unrotatable about the shaft 10 and is movable in the axial direction. As shown in FIG. 6, a plurality of angle-shape clutch convex portions 40 and valley-shape clutch concave portions 41, three in the first embodiment respectively, are equiangularly arranged on a lower surface of the clutch gear 32 and an upper surface of the clutch holder 35 opposing the lower surface of the clutch gear 32, respectively. When the clutch convex portions 40 and the clutch concave portions 41 fit with each other, the clutch gear 32 and the clutch holder 35 are in face-to-face contact with each other. When the clutch convex portions 40 and the clutch concave portions 41 do not fit with each other, the clutch gear 32 and the clutch holder 35 are not in face-to-face contact with each other.

The clutch gear 32 of the clutch member opposes the spring 36, and the clutch holder 35 of the clutch member opposes the washer 38. A plurality of angle-shape control convex portions 42 (two convex portions in the first embodiment) are equiangularly arranged on a lower surface of the clutch holder 35 facing the washer 38. The invertedly-trapezoidal control convex portion 42 has a top surface (a lower surface, or a bottom surface) 50 and sharp slope side surfaces 51 and 52.

The washer 38 is fixed to the gear case 11. A plurality of pairs, two slope pairs in the first embodiment, of a first contact portion 43 and a second contact portion 44 are equiangularly arranged, corresponding to the control convex portions 42, on an upper surface of the washer 38 facing the clutch holder 35. The left side surface 51 faces the first contact portion 43, and the right side surface 52 faces the second contact portion 44. The sharp slopes formed by the left side surface 51 and right side surface 52 are almost the same as those of the first contact portion 43 and the second contact portion 44.

A lower sliding path 45 and an upper sliding path 46 on which the top surface 50 slides with electric rotation of the mirror assembly 2 are arranged on the upper surface of the washer 38 facing the clutch holder 35 concentrically with the shaft 10. The lower sliding path 45 and the upper sliding path 46 are alternately arranged two by two on a circle of the washer 38 each of which corresponds to about one fourth (about 90 degrees) of the circle. A pair of the first contact portion 43 and the second contact portion 44 is arranged on ends of the lower sliding path 45, that is, at borders of the lower sliding path 45 and the upper sliding paths 46.

A plurality of fixing pawls 47 (four fixing pawls in the first embodiment) are equiangularly and integrally formed on an outer peripheral edge of the washer 38. The fixing pawls 47 are fixed to the gear case 11, so that the washer 38 is fixed to the gear case 11.

Figure 7:
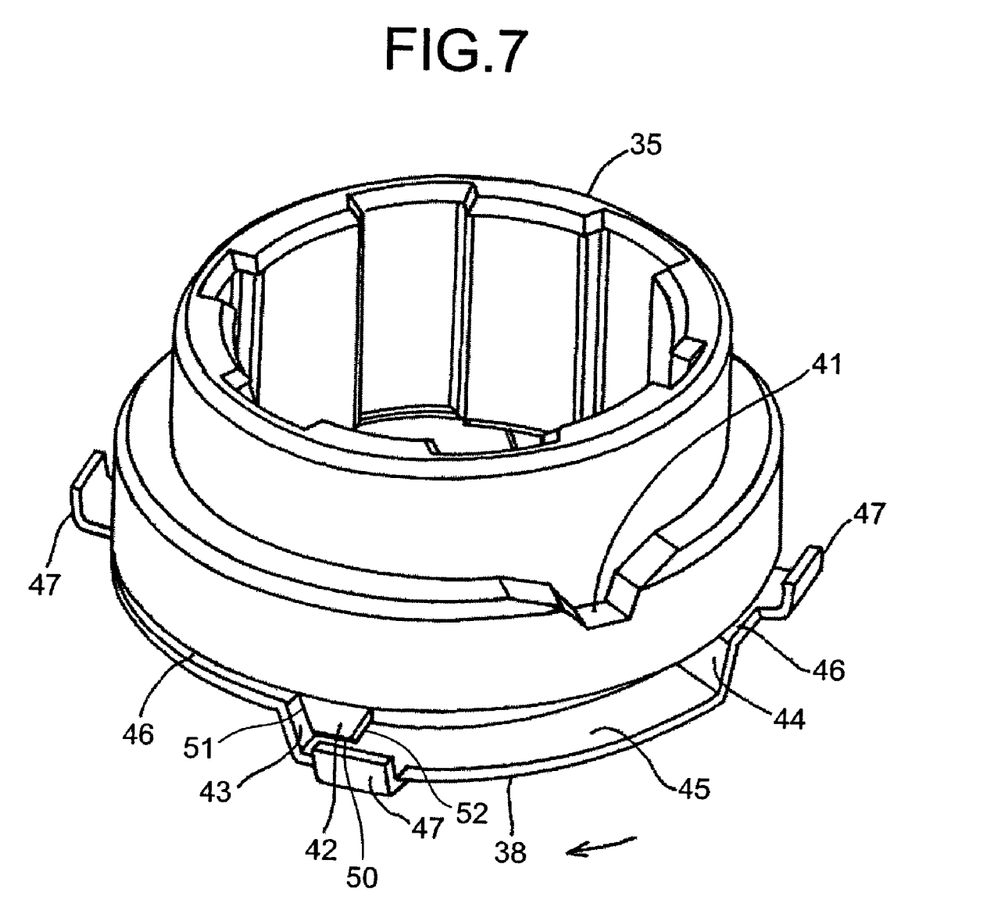
FIG. 7 is a perspective view of an assembly of the clutch holder and the washer.
Figure 8:
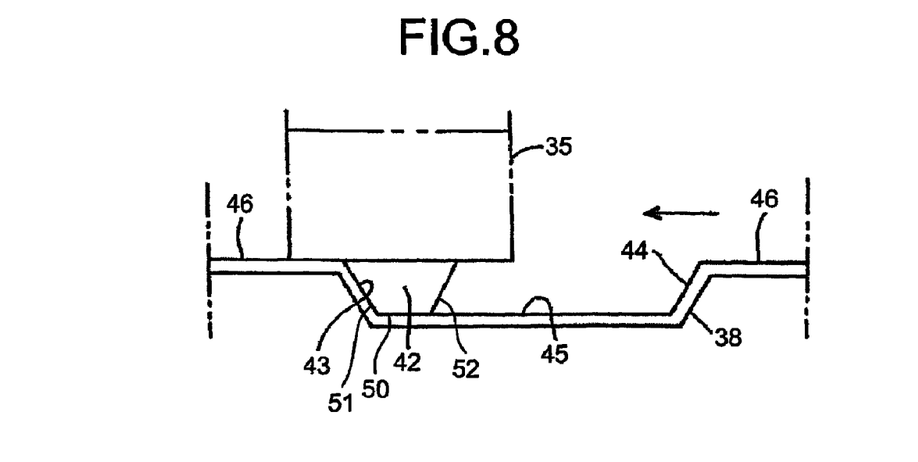
FIG. 8 is a schematic diagram representing a state where a control convex portion of the clutch holder is in contact with a first contact portion of the washer.
Figure 9:
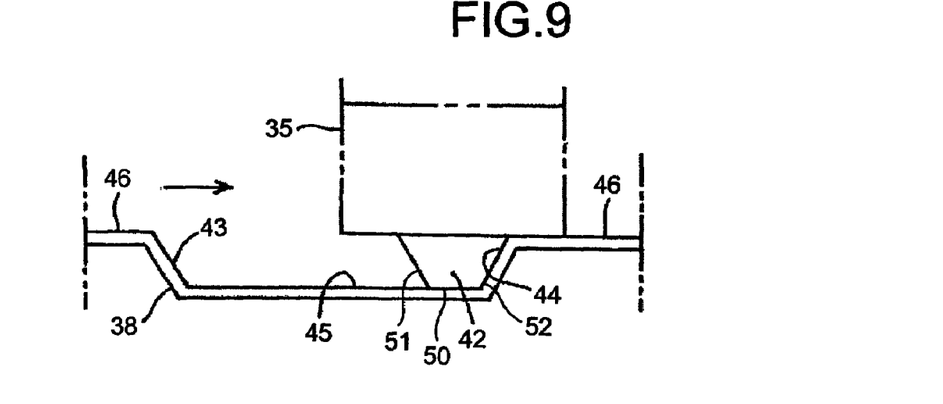
FIG. 9 is a schematic diagram representing a state where the control convex portion is in contact with a second contact portion of the washer.

The top surface 50 slides on the lower sliding path 45. In other words, as shown in FIGS. 7 to 9, the top surface 50 is in contact with the lower sliding path 45. The top surface 50 may not be in contact with the lower sliding path 45. If such is the case, the lower surface of the clutch holder 35 is in contact with the upper sliding path 46 and slides thereon. The left side surface 51 or the right side surface 52 comes into close contact with the first contact portion 43 or the second contact portion 44, so that a range of electric rotation of the mirror assembly 2 between the position C and the position B is controlled. That is, as shown in FIGS. 7 and 8, when the left side surface 51 comes into close contact with the first contact portion 43 on the lower sliding path 45, the mirror assembly 2 is controlled to the position C in FIG. 1. As shown in FIG. 9, when the right side surface 52 comes into close contact with the second contact portion 44 on the lower sliding path 45, the mirror assembly 2 is controlled to the position B in FIG. 1. When the mirror assembly 2 is controlled to the position B, the stopper surface 25 of the gear case 11 can come into contact with the stopper surface 22 of the stopper projection 21 on the shaft holder 9, instead of the right side surface 52 coming into contact with the second contact portion 44.

The clutch holder 35, the washer 38, the control convex portion 42, the first contact portion 43, and the second contact portion 44 are arranged in the gear case 11 and constitute an electric rotation range control mechanism that controls an electric rotation range of the mirror assembly 2. An existing clutch holder and an existing washer can be replaced by the clutch holder 35 and the washer 38 that are made of metal, respectively.

First, the mirror assembly 2 at the position C is electrically rotated to the position B to store the mirror assembly 2. When the mirror assembly 2 is at the position C, the clutch convex portion 40 and the clutch concave portion 41 are engaged with each other, so that the clutch gear 32 and the clutch holder 35 are in face-to-face contact with each other. Therefore, the clutch gear 32 and the clutch holder 35 cannot rotate about the shaft 10. The top surface 50 is positioned on the lower sliding path 45 of the washer 38 on the gear case 11 side. Moreover, the left side surface 51 comes into close contact with the first contact portion 43.

Under such conditions, a switch inside a vehicle (not shown) is operated to drive the motor 13. Then, the rotational force of the motor 13 is transmitted through the gear shaft 28 and the deceleration mechanism 14 to the clutch gear 32 fixed to the shaft 10. At this time, because the clutch gear 32 and the clutch holder 35 cannot rotate about the shaft 10, the second worm gear 31 rotates about the clutch gear 32. This rotation causes the mirror assembly 2 to rotate about the shaft 10 clockwise from the position C to the position B shown in FIG. 1.

When the mirror assembly 2 rotates clockwise from the position C to the position B, the gear case 11 also rotates clockwise about the shaft 10. Along with this rotation, the washer 38 rotates in a direction shown by an arrow in FIG. 8 and the top surface 50 slides on the lower sliding path 45.

When the mirror assembly 2 is positioned at the position B, as shown in FIG. 9, the right side surface 52 comes into close contact with the second contact portion 44. At this time, a current (an operating current) supplied to the motor 13 increases, and when the current reaches a predetermined value, the switch circuit 53 operates and the current supply to the motor 13 is stopped. Consequently, the mirror assembly 2 stops at the position B shown in FIG. 1 that is a predetermined position. At this time, because the stopper surface 22 comes into close contact with the stopper surface 25, the rotation of the mirror assembly 2 is controlled and the mirror assembly 2 is prevented from hitting a vehicle body.

For returning the mirror assembly 2 at the position B to the position C by electrically rotating it, the switch (not shown) inside the vehicle is operated to drive the motor 13, so that the mirror assembly 2 rotates counterclockwise from the position B to the position C.

Along with this rotation, the gear case 11 rotates counterclockwise about the shaft 10. Then, as shown in FIG. 9, the washer 38 rotates in a direction shown by an arrow and the top surface 50 slides on the lower sliding path 45.

When the mirror assembly 2 is positioned at the position C, as shown in FIG. 8, the left side surface 51 comes into close contact with the first contact portion 43. At this time, a current (an operation current) supplied to the motor 13 increases, and when the current reaches a predetermined value, the switch circuit 53 operates and the current supply to the motor 13 is stopped. Consequently, the mirror assembly 2 stops at the position C that is the predetermined position shown in FIG. 1.

Figure 11:
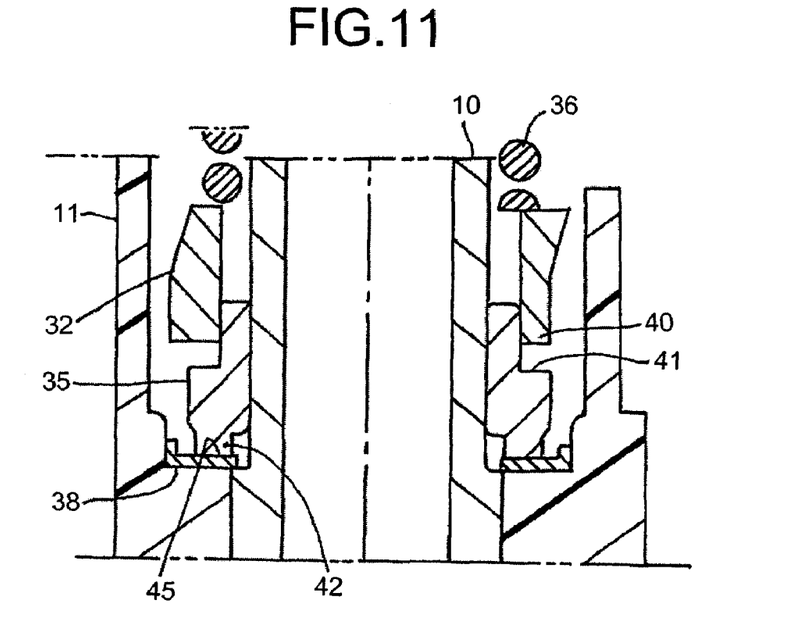
FIG. 11 is a schematic diagram representing a state where a fitting between a clutch concave portion of the clutch gear and a clutch convex portion of the clutch holder is released.
Figure 12:
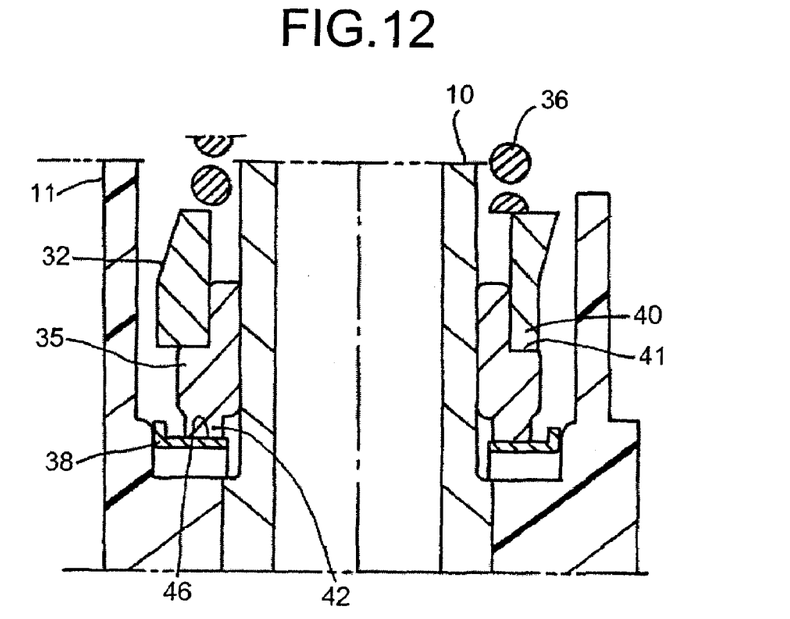
FIG. 12 a schematic diagram representing a state where the control convex portion slides on the upper sliding path.

Furthermore, when the mirror assembly 2 is manually rotated clockwise or counterclockwise between the position C and the position B, as shown in FIG. 11, the engagement between the clutch concave portion 41 of the clutch holder 35 that cannot rotate about the shaft 10 and the clutch convex portion 40 of the clutch gear 32 is released against a spring force of the spring 36. Therefore, the clutch gear 32 becomes rotatable about the shaft 10 together with the second worm gear 31.

This rotation causes the mirror assembly 2 to rotate about the shaft 10. Accordingly, the washer 38 rotates in a direction shown by the arrow in FIG. 8 or 9 and the top surface 50 slides on the lower sliding path 45. Consequently, the mirror assembly 2 is rotated clockwise from the position C to the position B or counterclockwise from the position B to the position C.

Figure 10:
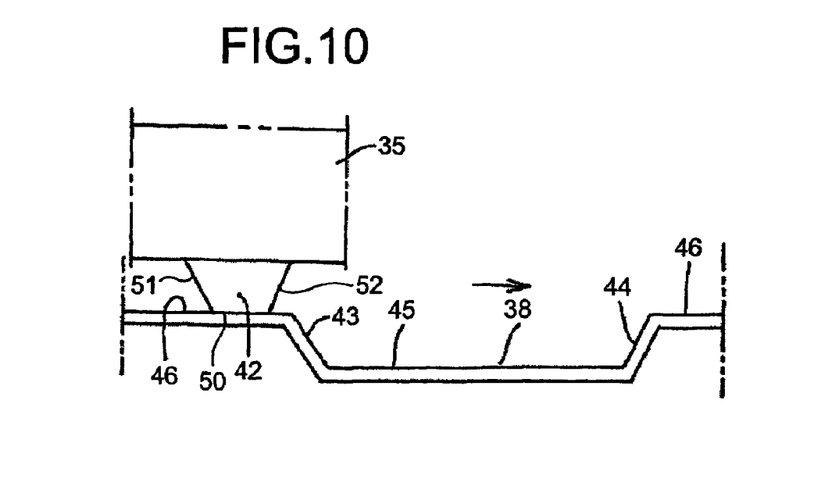
FIG. 10 is a schematic diagram representing a state where the control convex portion slides on an upper sliding path of the washer.

When the mirror assembly 2 positioned at the position C is manually rotated counterclockwise, the gear case 11 attached to the mirror assembly 2 rotates counterclockwise, so that the washer 38 rotates in a direction opposite to the arrow shown in FIG. 8. At this time, because the clutch gear 32 and the clutch holder 35 cannot rotate about the shaft 10, the clutch gear 32 and the clutch holder 35 move in the axial direction (up) of the shaft 10 against the spring force of the spring 36 shown in FIG. 12. Therefore, as shown in FIG. 10, the left side surface 51 climbs the first contact portion 43 and the top surface 50 slides on the upper sliding path 46. Thus, the mirror, assembly 2 rotates counterclockwise from the position C to the position A. When the mirror assembly 2 reaches the position A, the stopper surface 22 comes into close contact with the stopper surface 25, whereby the rotation of the mirror assembly 2 is controlled and the mirror assembly 2 is prevented from hitting the vehicle body.

Furthermore, when the mirror assembly 2 positioned at the position A is manually rotated clockwise, the gear case 11 attached to the mirror assembly 2 is rotated clockwise and the washer 38 is rotated in a direction opposite to an arrow shown in FIG. 10. This rotation causes the top surface 50 to slide on the upper sliding path 46. Then, the mirror assembly 2 is rotated clockwise from the position A to the position C. When the mirror assembly 2 reaches the position C, the clutch gear 32 and the clutch holder 35 move in the axial direction (down) of the shaft 10 by the spring force of the spring 36 shown in FIG. 3. As shown in FIG. 8, accordingly, the left side surface 51 comes into close contact with the first contact portion 43. Then, the mirror assembly 2 comes to the position C.

When a load is imposed on the mirror assembly 2 clockwise or counterclockwise, likewise of the manual rotation, the mirror assembly 2 rotates between the position C and the position B or between the position C and the position A for impingement protection.

According to the first embodiment, each control convex portion 42 comes into contact with the first contact portion 43 or the second contact portion 44, so that the electric rotation range of the mirror assembly 2 is controlled. Because the electric rotation range control mechanism is provided between the clutch holder 35 and the washer 38, it is sufficient to replace the clutch holder 35 and the washer 38, which are relatively small, for changing the electric rotation range of the mirror assembly 2. Therefore, the electric rotation range of the mirror assembly 2 can be changed at a lower cost than the case where a casing, which is relatively large, needs to be replaced for changing the electric rotation range.

Furthermore, the existing clutch holder and the existing washer are replaceable by the clutch holder 35 and the washer 38 of the electric rotation range control mechanism. Thus, the electric rotation range control mechanism can be mounted simply by replacing the present clutch holder and washer with the clutch holder 35 and the washer 38. Therefore, when the electric rotation range control mechanism is provided, the number of parts does not increase, and parts other than the clutch holder 35 and the washer 38 can be used as they are, so that the cost of the door mirror device 1 does not increase.

Moreover, according to the first embodiment, because the clutch holder 35 and the washer 38 are made of metal, the electric rotation range control mechanism exhibits durability higher than that of an electric rotation range control mechanism including resin-made gear case and cover and a rotational force transmission mechanism. In addition, the durability of the gear case 11 and the cover 12, which are made of resin, improves.

Furthermore, according to the first embodiment, when the mirror assembly 2 is rotated to the position A, the clutch gear 32, the clutch holder 35, and a part of the spring 36 move in the axis direction of the shaft 10, however, the gear case 11 does not move with respect to the shaft holder 9 in the axis direction. Thus, the gap between the lower surface (rotation surface) of the gear case 11 and the upper surface of the shaft holder 9 does not become large, so that foreign matter does not enter onto the rotation surface. Therefore, the gear case 11 rotates smoothly, resulting in improving the quality of the door mirror device 1.

Moreover, according to the first embodiment, because the gear case 11 does not move with respect to the shaft holder 9 in the axis direction of the shaft 10, the stopper projection 21 is in contact with the stopper surface 25 in a large area. Therefore, the strength of the stoppers improves.

Furthermore, according to the first embodiment, the electric rotation range control mechanism includes the clutch holder 35 that is integrally provided with the control convex portions 42 and the washer 38 that is integrally provided with the first contact portions 43 and the second contact portions 44, and does not require any other parts such as a ball for a typical rotation range control mechanism. Thus, the number of parts can be reduced, enabling to lower the cost for the door mirror device 1.

Moreover, according to the first embodiment, the control convex portions 42 are integrally provided on the clutch holder 35, and the first contact portions 43 and the second contact portions 44 are integrally provided on the washer 38. Thus, there is no need to consider a ball to come off from a ball holding member, which may happen in the case of a rotation range control mechanism using a ball. Therefore, the quality of the door mirror device 1 improves.

Furthermore, according to the first embodiment, the electric rotation range control mechanism includes the clutch holder 35 that is integrally provided with the control convex portions 42 and the washer 38 that is integrally provided with the first contact portions 43 and the second contact portions 44. Thus, the structures of the lower surface (rotation surface) of the gear case and the upper surface of the shaft holder can be simple and the rotation surface can be small, compared with a rotation range control mechanism using a ball. Therefore, the electric retracting unit 3 can be small.

Figure 13:
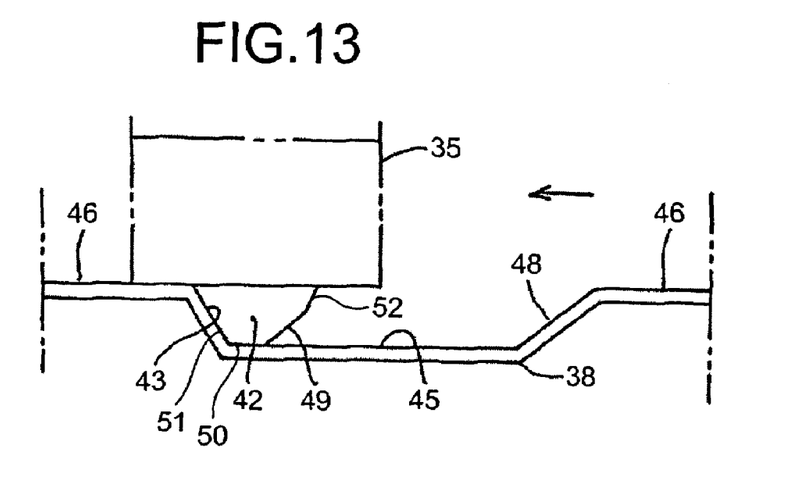
FIG. 13 is a schematic diagram of a vehicle outside mirror device according to a second embodiment of the present invention, representing a state where a control convex portion of a clutch holder is in contact with a first contact portion of a washer.
Figure 14:
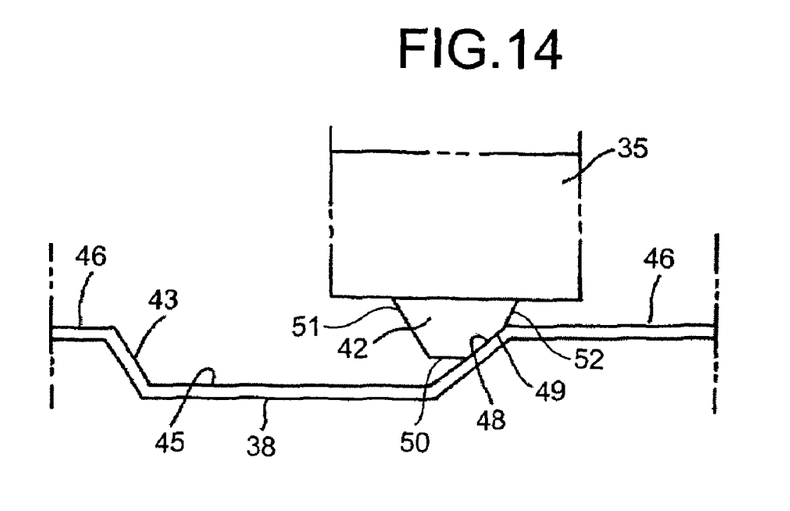
FIG. 14 is a schematic diagram representing a state where an inclined surface of the control convex portion moves along a rising inclined surface of the washer.

FIGS. 13 and 14 depict a vehicle outside mirror device 1 according to a second embodiment of the present invention. In the second embodiment, the components same as those in the first embodiment are given the same reference numerals.

In the second embodiment, the second contact portion 44 of the washer 38 in the first embodiment is replaced by a rising inclined surface 48 that is gentler than the second contact portion 44. When the mirror assembly 2 is positioned at the position B shown in FIG. 1, the right side surface 52 of the clutch holder 35 comes into contact with the rising inclined surface 48. Because the rising inclined surface 48 is gentle, the rising inclined surface 48 can reduce the rotation speed of the mirror assembly 2, i.e., the gear case 11. An inclined surface 49 is formed on the right side surface 52 of the control convex portion 42 to face the rising inclined surface 48. The inclined surface 49 moves along the rising inclined surface 48. The gradient of the rising inclined surface 48 is approximately the same as that of the inclined surface 49. The inclined surface 49 starts to move along the rising inclined surface 48 before the stopper member functions, i.e., before the stopper surface 22 comes into contact with the stopper surface 25. Alternatively, the first contact portion 43 can be replaced by a rising inclined surface having a gentle gradient and an inclined surface having a gradient approximately the same as that of the rising inclined surface of the first contact portion 43 can be formed on the left side surface 51.

The switch circuit 53 is a switch mechanism that cuts off a current to the motor 13 just before the stopper member functions and after the mirror assembly 2 reaches the position B shown in FIG. 1. The switch circuit 53 is, for example, a current controlling switch circuit including a Positive Temperature Coefficient (PTC) element and the like. When the current (operating current) supplied to the motor 13 increases and reaches a predetermined value, the switch circuit 53 stops the current supply to the motor 13. The switch circuit 53 is not limited to the current controlling switch circuit. For example, a mechanical switch mechanism including a limit switch can be employed to the switch circuit 53 other than the electrical switch mechanism.

When the mirror assembly 2 is rotated from the position C to the portion B, the inclined surface 49 moves along the rising inclined surface 48 having a gentle gradient before the stopper member functions, so that the rotation speed of the mirror assembly 2, i.e., the gear case 11, is reduced. With the movement of the inclined surface 49 along the rising inclined surface 48, the current (operating current) supplied to the motor 13 increases. When the mirror assembly 2 reaches the position B, the operating current reaches the predetermined value. Then, the switch circuit 53 is operated and the current supply to the motor 13 is stopped. Thus, the mirror assembly 2 stops at the position B. At this time, the stopper member functions, i.e., the stopper surface 22 comes into contact with the stopper surface 25. Therefore, the rotation of the mirror assembly 2 is controlled, and the mirror assembly 2 is prevented from hitting the vehicle body.

According to the second embodiment, the mirror assembly 2 can be positioned at the position B just before or at the time when the stopper member, which prevents the mirror assembly 2 from hitting the vehicle body, functions. Thus, impact or operation noise generated if the stopper member functions can be eliminated. Even if the stopper member functions, the impact or the operation noise can be low compared with the one in which the stopper member functions without reducing the electric rotation speed of the mirror assembly 2. Therefore, the displacement of the mirror surface of the mirror 8 can be prevented, and the durability of the components can be improved.

Furthermore, according to the second embodiment, when the mirror assembly 2 reaches the position B just before or at the time when the stopper member functions, the switch circuit 53 (switch mechanism) is operated and the current supply to the motor 13 is stopped. Thus, the mirror assembly 2 can be reliably stopped at the position B.

Moreover, according to the second embodiment, because the mirror assembly 2 can be reliably stopped at the position B just before or at the time when the stopper member functions, the impact or the operation noise, which is generated if the stopper member functions, can be reliably eliminated. Even if the stopper member functions, the impact or the operation noise can certainly be low.

In the embodiments described above, the present invention is applied to the electric retractable door mirror device. However, the present invention can be applied to other vehicle mirror devices including vehicle outside mirror devices such as a vehicle fender mirror.

Furthermore, in the embodiments described above, control convex portions 42 are provided to the clutch holder 35, and the first contact portions 43 and the second contact portions 44 are provided to the washer 38. Alternatively, the control convex portions 42 can be provided to the washer 38, and the first contact portions 43 and the second contact portions 44 can be provided to the clutch holder 35. Still alternatively, the control convex portions 42, the first contact portions 43, and the second contact portions 44 can be provided to each of the clutch holder 35 and the washer 38.

Moreover, in the embodiments described above, the control convex portions 42 are provided to the clutch holder 35. Alternatively, the positions of the clutch gear 32 and the clutch holder 35 can be swapped, and the control convex portions 42 can be provided to the clutch gear 32.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An outside mirror device for a vehicle, comprising:
a mirror assembly; and
an electric retracting unit that includes:
   a shaft holder that is fixed to a base,
   a shaft that is provided on the shaft holder,
   a casing to which the mirror assembly is attached, the casing rotatably mounted around the shaft, such that the mirror assembly is rotatably attached to a body of the vehicle through the electric retracting unit and the base,
   a motor that outputs a rotational force,
   a transmission mechanism that transmits the rotational force to the mirror assembly, and
   a rotation range control mechanism that is arranged in the casing and that controls a rotation range of the mirror assembly, the rotation range control mechanism including:
      a clutch gear that has a plurality of clutch portions on a surface thereof, and that is rotatably provided about the shaft to be axially movable,
      a clutch member of the transmission mechanism that has a plurality of fitting portions that fit the plurality of clutch portions of the clutch gear on a surface facing the clutch gear, and that is replaceable and is provided around the shaft to be axially movable,
      a washer that is replaceable and is fixed to the casing within the casing,
      a control convex portion integrally arranged on at least one of the clutch member and the washer,
      a contact portion that is arranged on at least other one of the clutch member and the washer and with which the control convex portion comes into close contact to control the rotation range of the mirror assembly, and
      a sliding path that is arranged on at least the other one of the clutch member and the washer within the casing, and includes the contact portion, wherein the sliding path is configured to be concentric with the shaft, and a top surface of the control convex portion is arranged to slide on the sliding path.

2. The outside mirror device according to claim 1, wherein the clutch member and the washer are capable of replacing an existing clutch holder and an existing washer.

3. The outside mirror device according to claim 1, wherein the clutch member and the washer are made of metal.

4. The outside mirror device according to claim 1, wherein when the mirror assembly is rotated to a forward inclined position side, the clutch member moves in an axial direction of the shaft.

5. The outside mirror device according to claim 1, wherein the contact portion is arranged integrally with at least the other one of the clutch member and the washer.

6. The outside mirror device according to claim 1, further comprising a stopper member for preventing the mirror assembly from coming into close contact with the body of the vehicle.

7. The outside mirror device according to claim 1, wherein the sliding path further includes a rising inclined surface to reduce a rotation speed of the mirror assembly.

8. The outside mirror device according to claim 7, further comprising a switch circuit that stops a current supply to the motor when the minor assembly reaches a predetermined position at a time when the control convex portion comes into close contact with the contact portion or when the control convex portion climbs and moves on the rising inclined surface.

9. The outside minor device according to claim 1, further comprising a switch circuit that stops a current supply to the motor when the mirror assembly reaches a predetermined position at a time when the control convex portion comes into close contact with the contact portion.

10. The outside mirror device according to claim 9, further comprising:
 a stopper member for preventing the mirror assembly from coming into close contact with the body of the vehicle.

\* \* \* \* \*